United States Patent
Wilson

[15] 3,697,491
[45] Oct. 10, 1972

[54] AMINE SALTS OF POLYHYDROSULFURIC ACIDS AS SHORTSTOPPING AGENTS FOR EMULSION POLYMERIZATIONS

[72] Inventor: Joan L. Wilson, Akron, Ohio
[73] Assignee: The Goodyear Tire & Rubber Company, Akron, Ohio
[22] Filed: Dec. 21, 1970
[21] Appl. No.: 100,412

[52] U.S. Cl..............260/82.3, 260/29.7 N, 260/83.3, 260/83.7, 260/85.1, 260/94.7 N, 260/96 R
[51] Int. Cl..........C08d 1/09, C08d 1/22, C08d 3/02
[58] Field of Search........260/94.7 N, 94.7 S, 29.7 R, 260/85.1, 83.3, 666.5, 82.3

[56] References Cited

UNITED STATES PATENTS

| | | | |
|---|---|---|---|
| 2,458,494 | 1/1949 | Durland | 260/666.5 |
| 3,291,795 | 12/1966 | Whiton et al. | 260/666.5 X |
| 3,402,138 | 9/1968 | Albert et al. | 260/29.7 |

FOREIGN PATENTS OR APPLICATIONS

| | | | |
|---|---|---|---|
| 552,069 | 1/1958 | Canada | 260/666.5 |

*Primary Examiner*—James A. Seidleck
*Assistant Examiner*—W. F. Hamrock
*Attorney*—F. W. Brunner and J. Y. Clowney

[57] ABSTRACT

There is disclosed a method for terminating free radical initiated emulsion polymerizations which comprises adding to said free radical initiated emulsion polymerization systems at least one shortstopping agent selected from the group consisting of (A) amine salts of polyhydrosulfuric acids, and (B) mixtures of at least one amine salt of a polyhydrosulfuric acid and at least one compound selected from the group consisting of alkali metal salts of di-lower-alkyl dithiocarbamates; hydroxylamines; hydroxylamine salts; N,N-dialkylhydroxylamines and N,N'-dialkyl-N,N'-methylene bishydroxylamines.

7 Claims, No Drawings

AMINE SALTS OF POLYHYDROSULFURIC ACIDS AS SHORTSTOPPING AGENTS FOR EMULSION POLYMERIZATIONS

This invention relates to the termination of emulsion polymerizations. More particularly this invention relates to compounds useful for the termination of free radical initiated emulsion polymerization systems.

There is available commercially a wide variety of compounds which are known to possess the capability for short-stopping (i.e., terminating) free radical initiated emulsion polymerization systems. The desirability of employing such compounds is obvious in view of the need for obtaining rubbers possessing desired optimum characteristics. However, most of the presently commercially available compounds do not fall within what may be referred to as a "general purpose" category. For example, a short-stopping agent which might be entirely satisfactory for terminating "hot" butadiene-styrene systems (i.e., persulfate iniated polymerizations) may not be satisfactory in short-stopping "cold" butadiene-styrene systems where a powerful initiator (i.e., hydroperoxides) is used. On the other hand, short-stopping agents which may be used in both cold and hot rubber polymerization processes may possess or produce severe disadvantages such as imparting undesirable color to the rubber, being water insoluble, being toxic to the extent of creating health problems, being susceptible to oxidation, or giving rise to materials which remain in the finished rubbers and cause undesirable and uncontrollable variations in vulcanization rates upon curing these rubbers. Another disadvantage might be the economic unattractiveness of the material as a commercial short-stopping agent brought about by the high costs of producing the material.

Thus, one of the objectives of the present invention is to provide a process for terminating both hot and cold emulsion polymerization processes. Another objective is to provide a new class of materials for terminating both hot and cold emulsion polymerization processes which substantially reduce or entirely eliminate the drawbacks mentioned above. Other objectives will become apparent as the description of the invention proceeds.

The amine salts of polyhydrosulfuric acids of the present invention have been described in the art as being useful as excellent vulcanizing agents and powerful accelerators in both natural and synthetic rubbers. It has now been found that these materials provide a useful and unexpected utility as effective free radical initiated emulsion polymerization shortstopping agents.

Accordingly, the present invention is directed to a process and materials useful in that process for terminating free radical initiated emulsion polymerizations, which comprises adding to free radical initiated emulsion polymerization systems selected from a group consisting of conjugated diolefins and conjugated diolefins in mixture with other copolymerizable monoolefins, at least one short-stopping agent selected from a group consisting of (A) amine salts of polyhydrosulfuric acids corresponding to the general formula

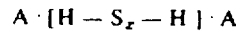

where x is an integer ranging from 2–9 inclusive and preferably from 2–5 inclusive and where A is a primary or secondary amine corresponding to the general formula

wherein $R_1$ is selected from a group consisting of hydrogen, alkyl radicals containing from one to 10 carbon atoms and cycloalkyl radicals containing from one to 8 carbon atoms in the cyclic ring and $R_2$ is selected from a group consisting of alkyl radicals containing from one to 10 carbon atoms and cycloalkyl radicals containing from one to 8 carbon atoms in the cyclic ring and wherein $R_1$ and $R_2$ together with the nitrogen atom to which $R_1$ and $R_2$ are attached can also form a saturated heterocyclic ring, and (B) mixtures of at least one amine salt of a polyhydrosulfuric acid corresponding to formula (I) above and at least one compound selected from a group consisting of alkali metal salts of di-lower-alkyl dithiocarbamates; hydroxylamines, hydroxylamine salt; N,N-dialkyl-hydroxylamine and N,N'-dialkyl-N,N'-methylenebishydroxylamine.

As stated earlier, the amine salts of polyhydrosulfuric acids have found prior use as excellent vulcanizing agents and accelerators for natural and synthetic rubber goods. When used for such purposes these materials are employed in crystalline form and are prepared by adding sulfur to an alcoholic solution of an amine and introducing hydrogen sulfide into this suspension. The reaction product is predominately a unitary solid compound and frequently settles out during the introduction of the hydrogen sulfide. For the purposes of the present invention, the amine salts of polyhydrosulfuric acids disclosed are prepared in an entirely different manner and are obtained as water soluble solutions. Thus in accordance with the teachings of the present invention a primary or secondary amine and elemental sulfur are first combined in water at ambient temperatures. The, with continued stirring, hydrogen sulfide is added until excess hydrogen sulfide is detected indicating that the reaction is complete. One means of detecting the excess hydrogen sulfide is by employing, for example, moist lead acetate paper. By the above procedure a clear aqueous solution of an amine salt of a polyhydrosulfuric acid is obtained.

The short-stopping materials prepared by the above procedure and useful in the process of this invention may be any amine salt of polyhydrosulfuric acids corresponding to the formulas set forth above, representative examples of which include bis(monomethylammonium) disulfide, bis(monomethylammonium) tetrasulfide, bis(dimethylammonium) disulfide, bis(dimethylammonium) tetrasulfide, bis(dimethylammonium) pentasulfide, bis(monoethylammonium) disulfide, bis(monoethylammonium) trisulfide, bis(monoethylammonium) tetrasulfide, bis(diethylammonium) disulfide, bis(diethylammonium) tetrasulfide, bis(diethylammonium) pentasulfide, bis(monopropylammonium) disulfide, bis(monopropylammonium) trisulfide, bis(monopropylammonium) tetrasulfide, bis(dipropylammonium) disulfide, bis(dipropylammonium) tetrasulfide, bis(monoisopropylammonium) disulfide, bis(monoisopropylammonium) trisulfide, bis(monoisopropylammonium) tetrasulfide, bis(diisopropylammonium) disulfide, bis(diisopropylammonium) tetrasulfide, bis(monobutylammonium) disulfide, bis(monobutylammonium) trisulfide, bis(monobutylammonium) tetrasulfide, bis(dibutylammonium) disulfide, bis(dibutylammonium) trisulfide, bis(dibutylammonium) tetrasulfide, bis(dibutylammonium) pentasulfide, bis(monocyclohexylammonium) disulfide, bis(monocyclohexylammonium) trisulfide, bis(monocyclohexylammonium) tetrasulfide, bis(dicyclohexylammonium) disulfide, bis(dicyclohexylammonium) trisulfide, bis(dicyclohexylammonium) tetrasulfide, bis(pentamethyleneammonium) disulfide, bis(pentamethyleneammonium) trisulfide, bis(pentamethyleneammonium) tetrasulfide and the like.

The addition of the short-stopping agents of the present invention will normally be carried out after the desired degree of polymerization (i.e., conversion) has occurred. The amount of short-stopping agent added will be that necessary to retard or terminate the polymerization as desired. The amount of short-stopping agent normally employed will be between about 0.01 and about 0.5 part per hundred parts of monomer (phm) with about 0.03 to about 0.20 phm being preferred.

As stated earlier, the short-stopping agents of the present invention include both the amine salts of polyhydrosulfuric acids alone and the amine salts of polyhydrosulfuric acids in admixture with other classes of short-stopping agents such as, for example, alkali metal salts of di-lower-alkyl dithiocarbamates and particularly the sodium salts of such materials (i.e., sodium dimethyl dithiocarbamate); hydroxylamines; hydroxylamine salts; N,N-dialkylhydroxylamines and N,N'-dialkyl-N,N'-methylenebishydroxylamines and the like.

Representative examples of these other classes of short-stopping agents which can be employed in admixture with the amine salts of polyhydrosulfuric acids include hydroxylamine; hydroxylamine hydrochloride; N,N-dimethyl hydroxylamine; N,N-diethyl hydroxylamine, N,N-dipropyl hydroxylamine; N,N'-dimethyl-N,N'-methylenebishydroxylamine; N,N'-di-n-propyl-N,N'-methylenebishydroxylamine and the like.

The present invention also contemplates the use of mixtures of amine salts of polyhydrosulfuric acids in addition to the specific teachings set forth hereinabove. The preparation of amine salts of polyhydrosulfuric acids is considered a quantitative one. However, allowing for experimental variation it is possible to obtain as a result of the reaction of a primary or secondary amine with elemental sulfur and hydrogen sulfide a mixture of amine salts of polyhydrosulfuric acids. For example, in the preparation of bis(dimethylammonium) tetrasulfide employing dimethylamine, elemental sulfur and hydrogen sulfide it may be possible to produce a reaction product mixture of bis(dimethylammonium) tetrasulfide, bis(dimethylammonium) trisulfide and bis(dimethylammonium) disulfide with the tetrasulfide compound being the predominant constituent in the mixture. Thus it can be seen that the "preformed" mixtures of amine salts of polyhydrosulfuric acids can be employed as short-stopping agents within the spirit of the present invention.

The short-stopping agents of the present invention are employed within the environs of conventional free radical initiated emulsion polymerization recipes. For example, the short-stopping agents of the present invention can be employed in either hot synthetic rubber recipes (persulfate or azonitrile initiated) or cold synthetic rubber recipes (hydroperoxide initiated). The monomeric materials useful in preparing synthetic rubber latices may be any of one or more conjugated diolefins either alone or in admixture with a copolymerizable monoolefin. Representative examples of the conjugated diolefins include the butadiene such as butadiene-1,3; isoprene; chloroprene; cylobutadiene-1,3; 2-phenylbutadiene; piperylene; 2,3-dimethylbutadiene-1,3 and the like. Representative examples of the copolymerizable monoolefin monomers include aryl olefins such as styrene; vinyl naphthylene; α-methylstyrene; para-chlorostyrene and the like; α-methylenecarboxylic acids and their esters, amides and nitriles such as acrylic acid, methacrylic acid, acrylonitrile, methacrylamide, and the like and vinyl halides such as vinyl chloride, vinylidene chloride, vinyl bromide and the like. In fact, the short-stopping materials of the present invention can be employed in any addition polymerization system which proceeds through a free radical polymerization mechanism.

PREPARATION OF SHORT-STOP AGENTS

A series of short-stopping agents were prepared for use in the illustrative examples set forth hereinbelow. The method of preparing these short-stopping agents was as follows:

A. Bis(dimethylammonium) tetrasulfide (DMATS): Through a mixture of one mol of aqueous dimethylamine and 1.5 gram atoms (48.0 grams) of elemental sulfur was bubbled hydrogen sulfide ($H_2S$) in excess of 0.5 mol. The temperature of the reaction was maintained at 30° C. by controlling the rate of $H_2S$ addition and/or by external cooling. Completion of the reaction was evidenced by the evolution of excess $H_2S$ as detected with moist lead acetate paper.

B. Bis(diethylammonium) tetrasulfide (DEATS): This short-stopping agent was prepared in the same manner as in A above except that 1 mol of aqueous diethylamine was substituted for the dimethylamine employed therein.

C. Bis(dimethylammonium) disulfide (DMADS): This short-stopping agent was prepared in the same manner as in A above except that only 0.5 gram atoms (16 grams) of elemental sulfur was employed.

D. Bis(diethylammonium) disulfide (DEADS): The preparation was the same as in C above except that diethylamine was substituted for dimethylamine.

E. Bis(monoisopropylammonium) tetrasulfide (MIPATS) was prepared in the same manner as A above except that isopropylamine was substituted for dimethylamine.

F. Bis(monomethylammonium) disulfide (MMADS) was prepared in the same manner as D above except that methylamine was substituted for diethylamine.

The normalities of the above short-stopping agents were determined by employing both direct titration with hydrochloric acid using bromophenol blue indicator and also by iodine titration employing a visual end point.

Although the above short-stopping agents were prepared at 30° C. and under atmospheric pressure, temperatures ranging from the freezing points to the boiling points of the solutions and pressures ranging from subatmospheric to superatmospheric can be employed in the preparation of these materials.

The practice of this invention is further illustrated by reference to the following examples which are intended to be representative rather than restrictive of the scope of this invention.

All percentages are given in terms of percent by weight unless otherwise indicated. The term "parts" as employed in the following examples refers to parts by weight of short-stopping agent per 100 parts of monomer charged. As employed in this application intrinsic viscosity [$\eta$] is defined as the limiting value at infinite dilution of the specific viscosity of a polymer, to its concentration.

EXAMPLE I

A series of polymerization termination experiments was carried out on a standard cold rubber, mixed cold soap styrenebutadiene polymerization recipe consisting of the following ingredients:

| MATERIAL | PARTS |
|---|---|
| Butadiene | 75.0 |
| Styrene | 25.0 |
| Water | 200.0 |
| Modifier (tertiary dodecylmercaptan) | 0.24 |
| Potassium soap of a disproportionated rosin acid | 2.25 |
| Potassium soap of a tallow fatty acid | 2.25 |
| Tamol N (sodium salt of a condensed naphthalene sulfonic acid) | 0.08 |
| Sodium hydrosulfite ($Na_2S_2O_4 \cdot 2H_2O$) | 0.028 |
| Ferrous sulfate heptahydrate ($FeSO_4 \cdot 7H_2O$) | 0.007 |
| Versene Fe·3 (composed of 90% tetrasodium salt of ethylene diamine tetraacetic acid and 10% monosodium salt of N,N-di($\alpha$-hydroxyethyl) glycine) | 0.007 |
| Sodium formaldehyde sulfoxylate | 0.025 |
| Paramenthane hydroperoxide | 0.06 |

All polymerizations were carried out at 5° C. to about 40–60 percent conversion of monomer to polymer. The short-stopping agent was then added and the polymerization systems maintained at 5° C. for an additional 16 hours. At the end of this time the polymerization systems were analyzed for an increase in polymer conversion and in some instances an increase in intrinsic viscosity. Experiments Nos. 1–6 were short-stopped, employing a dilute aqueous solution of bis(diethylammonium) disulfide (DEADS). Experiments Nos. 7–9 employed a dilute aqueous solution of a 50/50 mixture of DEADS and sodium dimethyldithiocarbamate (DTC) and Experiment No. 10 employed a dilute aqueous solution of a 50/50 mixture of bis(monoisopropylammonium) tetrasulfide and DTC. EXperiment No. 11 was performed as a control to show that continued polymerization takes place in the absence of the short-stopping agent. The table below contains all pertinent data.

TABLE

| Expt. No. | Shortstop | Parts | % Conv. (When Added) | Aging Temp. °C. | Gain in % Conv. |
|---|---|---|---|---|---|
| 1 | DEADS | 0.05 | 59.8 | 50 | 1.90 |
| 2 | " | 0.05 | 56.4 | 5 | 1.45 |
| 3 | " | 0.10 | 55.9 | 50 | 1.28 |
| 4 | " | 0.10 | 60.4 | 5 | 0.64 |
| 5 | " | 0.10 | 36.0 | 5 | 0.25 |
| 6 | " | 0.20 | 48.6 | 5 | 0.00 |
| 7 | DEADS/DTC | 0.06 | 56.3 | 5 | 1.34[b] |
| 8 | " | 0.06 | 46.3 | 5 | 0.87 |
| 9 | " | 0.10 | 54.9 | 5 | 0.19[c] |
| 10 | MIPATS/DTC | 0.10 | 55.0 | 5 | 0.5 |
| 11 | (a) | 0 | 55.0 | 5 | 45.0 |

(a) Control—no short-stopping agent added.
(b) Gain in intrinsic viscosity [$\eta$] was 0.01 deciliters per gram.
(c) Gain in intrinsic viscosity [$\eta$] was 0.03 deciliters per gram.

EXAMPLE II

A series of polymerization termination experiments similar to Example I was carried out except that the following standard persulfate initiated styrene-butadiene polymerization recipe consisting of the following ingredients was employed:

| Material | Parts |
|---|---|
| Butadiene | 75.0 |
| Styrene | 25.0 |
| Water | 200.0 |
| Tertiary dodecylmercaptan | 0.26 |
| Sodium soap of a tallow fatty acid | 4.5 |
| Potassium persulfate ($K_2S_2O_8$) | 0.3 |

All experiments were carried out at 50° C. When about 60 percent by weight conversions were obtained the short-stopping agent was added and the polymerization mixture aged for 16 hours at 50° C. The short-stopping agents employed in the present series of polymerizations were dilute aqueous solutions of bis(diethylammonium) disulfide (DEADS) either alone or in a 50/50 mixture with DTC, bis(diethylammonium) tetrasulfide (DEATS) in a 50/50 mixture with DTC and bis(monomethylammonium) disulfide (MMADS) in a 50/50 mixture with DTC. Experiment No. 8 was the control experiment to which no short-stopping agent was added. The data concerning these experiments are set forth in the table below:

TABLE

| Expt. No. | Shortstop | Parts | Weight % Conversion[a] | Gain in Weight % Conversion |
|---|---|---|---|---|
| 1 | DEADS | 0.20 | 62.2 | 0.45 |
| 2 | " | 0.20 | 62.6 | 0.00 |
| 3 | DEADS/DTC | 0.10 | 60.1 | 1.77 |
| 4 | " | 0.10 | 61.0 | 1.30 |
| 5 | DEATS/DTC | 0.10 | 60.7 | 1.33 |
| 6 | " | 0.10 | 60.0 | 1.13 |
| 7 | MMADS/DTC | 0.12 | 60.0 | 0.96 |
| 8 | (b) | — | 59.7 | 40.0 |

(a) Conversion at time of addition of short-stopping agent.
(b) Control experiment in which no short-stopping agent was added.

EXAMPLE III

A series of polymerization termination experiments was carried out similar to Example I except that the polymerization systems here were terminated employing as short-stopping agents dilute aqueous solutions of bis(dimethylammonium) tetrasulfide (DMATS) either alone or as a 50/50 mixture with DTC and bis(dimethylammonium) disulfide (DMADS) either alone or in a 50/50 mixture with DTC. All polymerizations were carried out at 25° C. and when a weight percent conversion of between about 50–60 percent was obtained varying amounts of short-stop were added. The short-stopped polymerizations were then maintained at 25° C. for an additional 16 hours at the end of which time they were analyzed for percent gain in conversion. The table below contains all pertinent information concerning this series of experiments:

TABLE

| Expt. No. | Shortstop | Parts | Gain in Weight % Conversion |
|---|---|---|---|
| 1 | DMATS | 0.10 | 0 |
| 2 | DMATS/DTC | 0.10 | 0.12 |
| 3 | DMADS | 0.10 | 0.50 |
| 4 | DMADS/DTC | 0.10 | 0.44 |

While certain representative embodiments and details have been shown for the purpose of illustrating the invention it will be apparent to those skilled in this art that various changes and modifications may be made therein without departing from the spirit or scope of the invention.

What I claim is:

1. A method for terminating free radical initiated emulsion polymerization systems selected from the group consisting of conjugated diolefins and conjugated diolefins in mixture with other copolymerizable monoolefins which comprises adding to said free radical initiated polymerization systems at least one water soluble solution shortstopping agent comprising amine salts of polyhydrosulfuric acids corresponding to the general formula $$A \cdot [H-S_x-H] \cdot A$$

wherein $x$ is an integer ranging from 2 to 9 inclusive and preferably from 2 to 5 inclusive, and where A is a primary or secondary amine corresponding to the formula

wherein $R_1$ is selected from a group consisting of hydrogen, alkyl radicals containing from one to 10 carbon atoms and cycloalkyl radicals containing from one to 8 carbon atoms in the cyclic ring, and $R_2$ is selected from a group consisting of alkyl radicals containing from one to 10 carbon atoms and cycloalkyl radicals containing from one to eight carbon atoms in the cyclic ring, and wherein $R_1$ and $R_2$ together with a nitrogen atoms to which $R_1$ and $R_2$ are attached can also form a saturated heterocyclic ring and wherein the amount of the water soluble shortstopping agent employed can range from about 0.01 to about 0.5 part per 100 parts of monomer.

2. A method according to claim 1 wherein the free radical emulsion polymerization system employs a conjugated diolefin.

3. A method according to claim 2 wherein the conjugated diolefin is 1,3-butadiene.

4. A method according to claim 1 wherein the free radical initiated emulsion polymerization system employs a mixture of a conjugated diolefin and a copolymerizable monoolefin.

5. A method according to claim 4 wherein the conjugated diolefin is 1,3-butadiene and the copolymerizable monoolefin is styrene.

6. A method according to claim 4 wherein the conjugated diolefin is 1,3-butadiene and the copolymerizable monoolefin is acrylonitrile.

7. A method according to claim 1 wherein the amine salt of a polyhydrosulfuric acid is selected from the group consisting of bis(dimethylammonium) tetrasulfide; bis(dimethylammonium) disulfide; bis(diethylammonium) tetrasulfide and bis(diethylammonium) disulfide.

* * * * *